Patented Sept. 12, 1933

1,926,058

UNITED STATES PATENT OFFICE 1,926,058

PROCESS OF PURIFYING GAS

William W. Odell, Chicago, Ill.

No Drawing. Application October 2, 1930
Serial No. 486,043

8 Claims. (Cl. 23—3)

My process relates to the removal of impurities from gases such as coal gas, coke-oven gas, carbureted water gas and other gases containing impurities such as styrene, indene, cyclopentadiene and other gum-forming materials. In particular, my process is concerned with the removal from gases of materials that are present in the vapor phase normal temperature and pressure, namely at 60° Fahrenheit and 30 inches of mercury barometric pressure, which under certain conditions polymerize or oxidize or polymerize and oxidize simultaneously forming materials that have a greater molecular weight than the materials initially present and a lower vapor pressure. Indene and styrene are typical of the class of substances that I remove from gas by my process and they are discussed by way of example in the following.

One of the objects of my invention is to remove gum-forming or other materials from gas, such as oven gas, which are initially present in the vapor phase. Other objects will become apparent from the disclosures herein made.

I find that after coke-oven gas has been washed purified as regards sulphur compounds and oil-scrubbed (or otherwise scrubbed) at substantially atmospheric pressure for the recovery of benzene and toluene there remains in the gas in the vapor phase a certain small amount of indene or styrene or both. There is a limit to the amount of wash oil that can economically be used in scrubbing gas in this manner and a definite limit to the amount that can be removed as well as a limit to the amount of such impurities that can remain in the gas; this limit is established by variables that include the equilibrium relations as regards temperature, vapor pressure of the materials and solution pressure of the vapors of said materials; the pressure being substantially atmospheric.

Although oven gas that is scrubbed as described, using about 10 to 12 gallons of wash oil as absorbent during scrubbing for each 1000 cubic feet of gas treated yields a finished gas that is usually considered to be a clean gas and is commonly successfully distributed under low pressure as such. I find that when this gas is compressed to about 40, 60 or 100 pounds or more pressure per square inch considerable change occurs both with respect to equilibrium conditions and the composition and state of the impurities. Polymerization occurs and, when some free oxygen is present in the gas, oxidation also occurs. This polymerization and oxidation is favored by pressure and by oxygen concentration as well as by the concentration of the impurities in the cleaned gas. Thus the higher the pressure, the greater the amounts of oxygen or of gum-forming unsaturates or of both in the gas, the greater the amount of reaction that occurs, other factors remaining the same. The rate at which equilibrium is attained is more rapid as the temperature increases; the amount of reaction that can occur at equilibrium is greater with rising temperature.

When the so-called clean oven gas is compressed say to 100 pounds gage pressure per square inch, there is an accompanying rise in temperature which favors the formation of gummy and resinous materials by the polymerization and oxidation reactions. Usually the extent to which the gummy and resinous matter form upon compressing a given gas containing gum-forming materials depends upon and increases with the pressure. However in most instances the gummy and resinous material formed is in the state of a fog in which the particles are in a very fine state of subdivision, some of them being so small as to be comparable with the particles in smoke. It is common knowledge that it is almost impossible to remove a fine fog of this character from a gas by the usual methods of scrubbing with water or oil. I find that because the element of time is an important factor in the formation of gummy matter that the use of a Cottrell precipitator or the equivalent immediately following compression which precipitates suspended matter from gas, does not completely eliminate the trouble experienced from gums because they continue to form after the gas is passed through the precipitator. When allowed to pass into the distribution system the gummy matter tends to deposit on the slide valves of meters, and leather diaphragms, and in pilots and other parts of burner equipment and appurtenances.

I find that I can remove the gummy matter and also much of the remaining gum-forming material present in the gas by a definite procedure. The smallness of the particles (droplets) normally formed on compressing purified coke oven gas is not necessarily due to the suddenness with which the pressure is applied, nor because of the rise in temperature that normally accompanies and results from compression; it is largely because of the small quantity of gum-forming material present in the gas and because of the smallness of the amount of other organic matter present that is condensed by the compression. I find that when the raw coke oven gas is not so intensively scrubbed for benzole recovery as in common practice there is an appreciable amount of oily matter condensed from the gas upon subsequent compression and that when this occurs the particles or droplets of gum-formers form with the oily matter larger size droplets that are readily removed by oil scrubbing at high (superatmospheric) pressure. The amount of benzole, toluene or other condensable matter that should be left in the gas prior to compressing, in order to obtain optimum results is not a constant for all sets of conditions but varies depending upon the pressure to which the gas is compressed prior to scrubbing. For example, an amount of light oil that will condense at 120 pounds pressure may remain entirely in the vapor phase at 40 pounds pressure. It is essential to have sufficient oil present so that condensation occurs by virtue of compression. To clarify this point, let it be assumed that benzene is the only readily condensable material present in the gas besides the gum-forming materials. The absolute vapor pressure of benzene at 20° centigrade is approximately 75 millimeters, which means that at 1 atmosphere absolute pressure the amount of benzene vapor that can remain in the gas at 20° C. is approximately $$\frac{75}{760} \times 100$$

or 9.86 per cent. At the same temperature (20° C.) and 120 pounds absolute pressure (approximately 760×8.16 atmospheres or 6202 millimeters) the amount of benzene vapor that can remain in the vapor phase in the gas is approximately $$\frac{75}{6202} \times 100$$

or 1.2 per cent. In this example the amount of benzene desired in the gas prior to compression is somewhat more than 1.2 per cent if the gas is to be compressed to 120 or more pounds absolute pressure per square inch, whereas if the gas is to be compressed only to 2 atmospheres absolute pressure the gas should contain an amount of benzene vapor in excess of 4.9 per cent prior to compressing. A large excess of benzene is not required, nor usually desired.

It is preferable but not necessary to leave benzole or toluene in the gas in amounts sufficient to condense upon compression; a similar result is obtained when the vapors of another organic material, preferably an oil, is introduced into the gas prior to compressing. In this case the condensate produced by compression is not benzole but the material added. The organic materials thus added should not be unsaturates that form gums and resins.

Oxygen hastens the polymerization of the gum-forming unsaturates and also causes their oxidation and I find that it is desirable to have some oxygen present in the gas at the time of compressing. One per cent of oxygen in the gas will be as effective at 8 atmospheres pressure as 8.0 per cent of oxygen at 1 atmosphere pressure. Oxygen is actually a catalyst to the formation of gummy matter from gum-forming unsaturates. Other oxidizing agents function in a similar manner.

It is understood that the gas after compression, containing the condensed vapor (mist) and gummy matter, is subsequently scrubbed while under superatmospheric pressure. Under some conditions I prefer to allow a period of time to lapse between compressing and the subsequent treatment for the removal of mist. The reason for this is that there is a certain amount of time required for reactions to reach equilibrium. When there is no catalyst present and the gas is free from oxidizing agents such as oxygen, or when the gas pressure is not high the rate of reaction is much slower than when the pressure is high, say 100 to 150 pounds gage or when an appreciable amount of oxygen is present.

It is understood, according to the above description in which by example 20° C. is referred to, that the gas after compression is cooled to substantially this temperature. It is also understood that the gas initially (before compression) contains such an amount of condensable vapor that some condensation occurs by virtue of compression and subsequent cooling to about 20° centigrade.

Having described my invention so that one skilled in the art can practice it, I claim:

1. The process of purifying fuel gas which gas is substantially free from tarry-matter, gums, and hydrogen sulphide but which contains gum-forming material and a condensable vapor of an organic solvent for the resulting gum, comprising, compressing said gas to a superatmospheric pressure allowing it to become heated by virtue of compression, causing said gum-forming material to form gum, causing said vapor to condense forming droplets containing said gum, and removing the condensed matter from said gas as a liquid.

2. The process of purifying fuel gas which is substantially free from tarry-matter, gums, and hydrogen sulphide but which contains a gum forming material and a condensable vapor of organic solvent for the resulting gum, comprising, compressing said gas to a pressure of the order of 100 pounds per square inch, allowing it to become heated by virtue of compression, causing said gum-forming material to form gum, causing said vapor to condense forming droplets containing said gum, and subsequently removing the condensate from said gas by scrubbing it while under said pressure.

3. The process of purifying fuel gas, which gas is substantially free from tarry-matter, and hydrogen sulphide but which contains a gum-forming material and a condensable vapor of an organic solvent for the resulting gum, comprising, compressing said gas to a pressure greater than 2 atmospheres causing a rise in its temperature, causing said gum-forming material to form gum, cooling the compressed gas, causing some of said vapor to condense forming droplets containing said gum, and subsequently removing the condensate from said gas.

4. The process of purifying fuel gas containing gum-forming material, which gas has previously been treated for the removal of hydrogen sulphide, comprising, compressing said gas in the presence of a relatively small amount of oxygen and the vapor of a solvent for the resulting gum-material, causing gum to form from said gum-forming material, cooling the compressed gas condensing some of said solvent vapor in the presence of said gum and removing both in a common fluid.

5. The process of purifying fuel gas that has previously been treated for the removal of hydrogen sulphide, which gas contains gum-forming material, an oxidizing agent and the vapor of a solvent for the resulting gum, comprising, compressing said gas to a superatmospheric pressure thereby forming a gum, cooling the compressed gas causing condensation of said solvent and subsequently removing said gum in soltuion in said solvent.

6. The process of purifying gas that has previously been treated for the removal of hydrogen sulphide, which gas contains gum-forming material, a relatively small amount of oxygen and the vapor of a solvent for the resulting gum, comprising, compressing said gas to a superatmospheric pressure of the order of 20 to 150 pounds gage with accompanying rise in its temperature forming a gum, cooling the compressed gas causing condensation of said solvent and subsequently removing said gum in solution in said solvent.

7. The process of purifying fuel gas that has previously been treated for the removal of hydrogen sulphide and condensed impurities, which gas contains a gum-forming material, an oxidizing agent adapted to react with said gum-forming material, and the vapor of a solvent for the resulting reaction product, comprising, compressing said gas to a superatmospheric pressure greater than about 2 atmospheres causing said gum-forming material to react chemically forming a gummy-reaction-product, cooling the compressed gas condensing the vapor of said solvent into droplets containing the said gummy-reaction-product and subsequently removing both as a liquid.

8. The process of purifying fuel gas that has previously been treated for the removal of hydrogen sulphide and condensed impurities, which gas contains a gum-forming material and the vapor of a solvent for the resulting gum-material, comprising, introducing into said gas a relatively small amount of an oxidizing agent, compressing the mixture to a superatmospheric pressure above about 2 atmospheres, forming a gum from said gum-forming material, cooling the compressed mixture condensing the vapor of said solvent and removing said gum in solution in the condensed solvent.

WILLIAM W. ODELL.